United States Patent [19]

Cowan

[11] 4,387,551
[45] Jun. 14, 1983

[54] HEAT-SEALABLE, OVENABLE CONTAINERS AND METHOD OF MANUFACTURE

[75] Inventor: David A. Cowan, Owings Mills, Md.

[73] Assignee: Maryland Cup Corporation, Owings Mills, Md.

[21] Appl. No.: 221,908

[22] Filed: Dec. 31, 1980

Related U.S. Application Data

[62] Division of Ser. No. 77,548, Sep. 21, 1979, Pat. No. 4,261,504.

[51] Int. Cl.³ .......................... B65B 7/28; B65B 51/10
[52] U.S. Cl. .......................................... 53/478; 156/69
[58] Field of Search .......................... 53/478, 477, 373; 156/69; 229/43, 48 T, DIG. 14; 426/113

[56] References Cited

U.S. PATENT DOCUMENTS

| | | | |
|---|---|---|---|
| 2,586,446 | 2/1952 | Stockburger | 53/478 X |
| 3,060,652 | 10/1962 | Eckman | 53/478 |
| 3,488,201 | 1/1970 | Pizarro | 53/478 X |
| 3,583,125 | 6/1971 | Vermeulen | 53/478 X |
| 3,645,825 | 2/1972 | Gaunt et al. | 53/478 X |
| 3,701,699 | 10/1972 | Jackson | 53/478 X |
| 3,865,302 | 2/1975 | Kane | 229/43 |
| 3,937,396 | 2/1976 | Schneider | 229/48 T X |
| 3,997,677 | 12/1976 | Hirsch et al. | 426/113 |
| 4,210,674 | 7/1980 | Mitchell | 229/DIG. 14 |

Primary Examiner—Horace M. Culver
Attorney, Agent, or Firm—Birch, Stewart, Kolasch and Birch

[57] ABSTRACT

A heat-sealable, ovenable container and method of manufacture wherein one of the components of the container, for example, the tray, is provided with a thermoplastic polyester coating and the other component, for example, the lid, is provided with a thermosetting polyester coating, said coatings cooperating to produce a self-venting, easy-tear, sanitary seal.

13 Claims, 5 Drawing Figures

HEAT-SEALABLE, OVENABLE CONTAINERS AND METHOD OF MANUFACTURE

This application is a divisional of copending application Ser. No. 77,548, filed on Sept. 21, 1979, now U.S. Pat. No. 4,261,504.

BACKGROUND AND SUMMARY OF THE INVENTION

The present invention relates to a heat-sealable, ovenable container and to a method of manufacturing the container. More particularly, the present invention is directed to a heat-sealable container which is provided with a self-venting, easy-tear, sanitary seal which prevents discoloration during heating and decreases the bacteria, mold, and fungi levels in food sealed within such containers.

The most common containers for convenience foods which are to be heated within the containers are formed of thin sheet aluminum or layers which include aluminum foil. Because of the relatively high cost of such containers and because they generally cannot be used in microwave oven cooking, substantial efforts have been made to provide plastic coated paperboard containers which can withstand oven heating.

Presently, thermoplastic polyethylene terephthalate coated paperboard trays are being used in both microwave and conventional ovens. These trays are equipped with mechanically attached polyethylene terephthalate coated paperboard lids as well as uncoated paperboard lids or alternatively, the trays are sealed with transparent or translucent films. The unsealed mechanically attached lids vent well during rethermalizing, that is, heating food stored within the container, and readily accept detailed art work. However, since the lid and tray are not a unitized sealed container, package stability and hygiene problems are encountered when trays containing food are stored and/or stacked. Thus, color changes frequently occur in food which is rethermalized in unsealed containers.

On the other hand, although translucent film lids also provide effective self-venting during rethermalization, containers or cartons containing film-type closures or lids are generally fragile and thus break easily and accordingly are not stackable. Also, such containers perform badly with respect to their acceptance of detailed art work and ingredient copy. Furthermore, since films are transparent or at best translucent, any color change or formation of condensation which may have occurred during freezing, thawing, or cooking is readily noticeable through the film. Since frozen foods in the frozen state are not very attractive until reconstituted to an edible condition, it is desirable not to package foods so as to be visible in the retail package.

The present state of the art for forming food containers involves sealing thermoplastic polyethylene terephthalate coated paperboard lids to thermoplastic polyethylene terephthalate coated paperboard trays with heat before cooking. However, because the polyethylene terephthalate, which acts as a hot melt adhesive, is coated on both the lid and the tray, the seal produced therebetween is too strong and thus the container cannot be readily opened after rethermalization without damaging the container or its contents. Furthermore, although the seal is strong, it is not water-tight which disadvantageous from a hygienic point of view. Additionally, present sealing methods cannot seal thermoplastic polyethylene terephthalate lids to trays in which the polyethylene terephthalate has already been crystallized by heat. This crystallization is a common phenomenon since the food is cooked in the tray at elevated temperatures up to about 425° F. which is just about at the crystallization range of polyethylene terephthalate.

Accordingly, an object of the present invention is to provide a heat-sealable container which protects food contained therein by decreasing the bacteria, mold and fungi levels within the container.

Another object of the present invention is to provide a heat-sealable, ovenable container which is provided with a self-venting, easy-tear seal between the lid and the tray of the container.

A further object of the present invention is to provide a heat-sealable, ovenable paperboard container which readily accepts detailed art work and accordingly can be printed by gravure, lithography, or flexography.

Still another object of the present invention is to provide an improved method of achieving a seal between the lid and the tray of an ovenable container which is effective in achieving all of the aforementioned objects.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the present invention will become apparent to those skilled in the art from this detailed description.

Pursuant to the present invention, the above disadvantages may be eliminated and the objects of the present invention can be achieved by providing one portion of the container, for example, the lid with a thermoplastic polyester coating and the other portion of the container, that is, the tray with a cross-link thermosetting polyester containing coating. On the other hand, if the lid is provided with the cross-linked, thermosetting polyester-containing coating, then the tray must be provided with a thermoplastic polyester coating. It is the unique combination of a thermoplastic polyester coating and a cross-linked, thermosetting polyester coating on respective portions of a container which is effective in achieving a seal which provides a sanitary closure during handling and shipment, prevents discoloration of the food during heating, decreases bacteria, mold, and fungi levels in the food disposed within the container and is self-venting upon the substantial completion of the cooking or reheating cycles. Thus, when the sealed container is heated, an increase in internal vapor pressure acts as a barrier in preventing dehydration and caramelization of the food contained therein. When the release of the seal takes place, that is, just about the time the cooking cycle or reheating cycle is completed, the product is ready to be served. Since the vapor barrier is present in the carton or container up to this point in time, none of the aforementioned problems are produced. Thus, the use of the seal container as defined by the present invention retains heat since no steam is released during the heating process. The retention of the heat and the moisture drastically reduces the amount of bacteria, mold, and fungi levels of the prior art containers.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
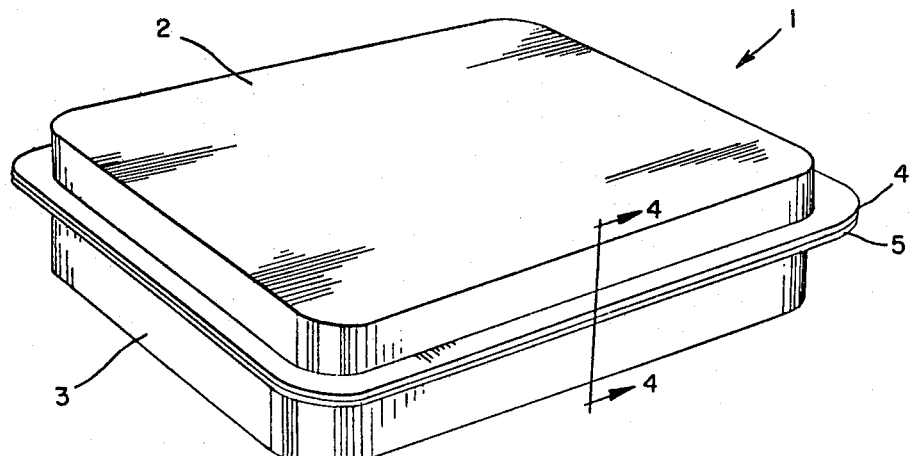
FIG. 1 shows a typical container in a closed state in accordance with the present invention.
Figure 2:
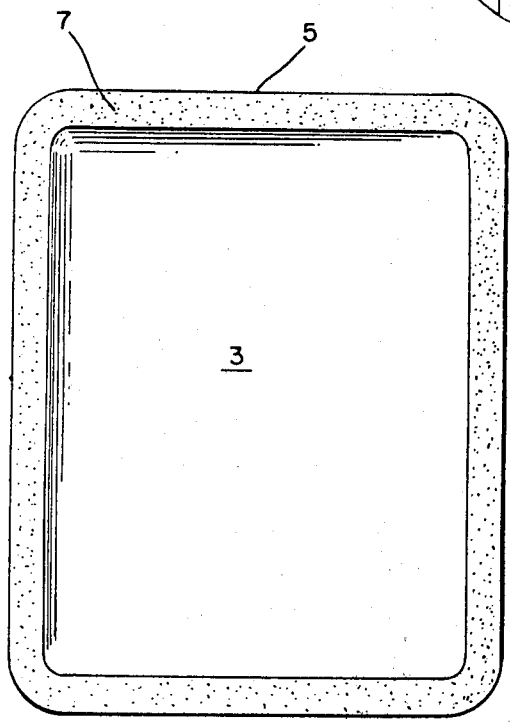
FIG. 2 shows the tray portion of the container of the present invention which is provided with a polyester coating on the lip portion thereof.
Figure 3:
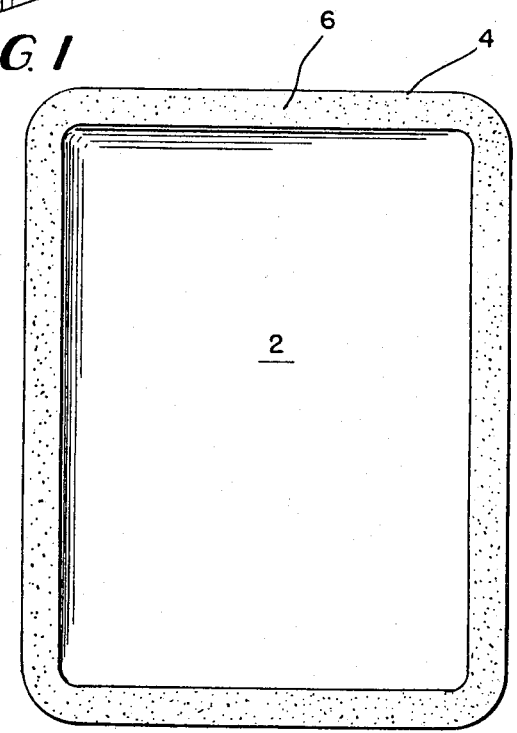
FIG. 3 shows the lid portion of the container of the present invention which is provided with a polyester coating on the lip thereof.
Figure 4:
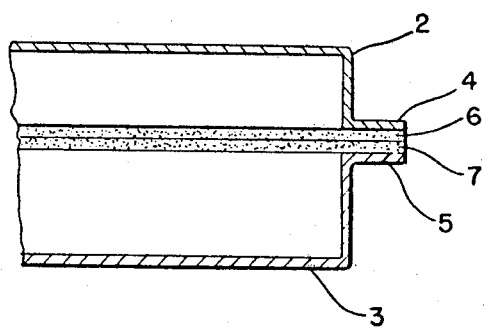
FIG. 4 shows a cross sectional view of the container of FIG. 1 taken along line 4—4 of FIG. 1.
Figure 5:
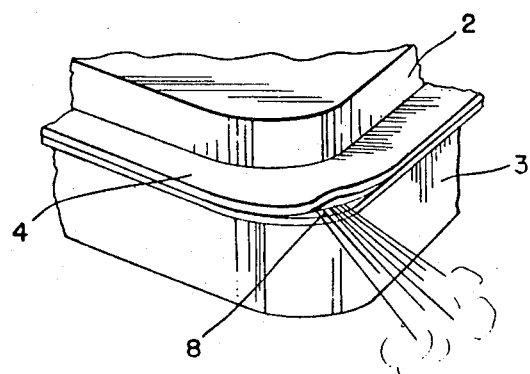
FIG. 5 shows, in perspective, the self-venting feature of the container of the present invention.

The present invention will now be described in greater detail in connection with the attached drawings wherein element 1 of FIG. 1 represents the container of the present invention. The container includes a lid portion 2 and a tray portion 3. The lid portion 2 is provided with a peripheral lip 4 for accommodating either a thermoplastic or thermosetting polyester coating 6. The tray portion 3 is also provided with a lip 5 which contains either a thermoplastic polyester or thermosetting polyester 7. As stated hereinabove it is only important that when a thermoplastic polyester coating is used on one portion of the container, for example the lid, then a thermosetting polyester must be used on the other portion of the container, for example the tray. FIG. 4 is a cross sectional view taken along line 4—4 of FIG. 1. FIG. 5 shows how the container of the present invention self-vents through aperture 8 upon the substantial completion of the cooking or reheating cycles.

Because a thermosetting polyester coating is not used on both the closure or lid portion and the tray portion of the container, as in many of the prior art sealing methods, an excessive seal between the tray and the lid is avoided. Also, the self-venting aspect of the seal of the present invention can be achieved. According to the present invention, the cross-linked, thermosetting polyester coating does not melt and accordingly does not act as a hot melt adhesive in the same manner as the thermoplastic polyester coating. Thus, the adhesive function is primarily provided by the thermoplastic polyester coating with the cross-linked thermosetting polyester coating functioning in all other respects as an effective plastic coating for the heat-sealable container of the present invention.

The thermoplastic polyester coating which can be utilized in the present invention includes any thermoplastic material which possesses a high melting temperature and good structural strength and is compatible with and unaffected by most food products. Polyethylene terephthalate has been found to be particularly effective as such a coating.

The cross-linked thermosetting polyester coating which can be utilized in the present invention includes any thermosetting polyester which is effective and compatible with the thermoplastic polyester coating in achieving the heat-sealable container of the present invention. Suitable thermosetting polyester coatings are those made from a water-reducible melamine polyester copolymer, advantageously catalized by paratoluene sulfonic acid. The preferred thermosetting polyester is Roymal 8682, a product of Roymal.

The thermoplastic polyester coating is applied to the container by extrusion as a hot melt. The thermosetting polyester coating is applied to the paperboard container by a flexographic or similar type press at a speed of about 50 to 125 feet per minute at an air temperature of about 430° to 480° F. Both the thermoplastic and thermosetting coatings are applied to the paperboard products in thicknesses of up to about 2 mils, advantageously about 0.8 to 1.8 mils.

Another feature of the present invention is directed to the method in which the lid or closure is applied to the tray in order to achieve the desired seal between the lid and the tray. Advantageously, the seal between the lid and the tray is effected at a temperature of about 496° to 650° F., preferably about 530° to 600° F., utilizing a rim pressure of about 108 to 200 psi, preferably 140 to 180 psi. The rim pressure can be defined as that pressure which is applied to the peripheral contact areas made when the lid is closed on the tray. The above rim pressure is important in producing a good heat flow between the lid and the tray and thus achieve the desired contact and resulting seal between the lid and the tray. A rim pressure lower than the above range would not achieve the desired sealing effect whereas a pressure higher than the above range would create such a strong seal that the container would not self-vent in the oven and would have to be damaged in order to separate the lid from the tray.

In some instances, fluoro-chemicals, for example, Scotch Ban ($FC_8O_7$) are introduced into the paperboard or applied as a coating on the paperboard in order to keep grease from penetrating into the paperboard. However, the use of fluoro-chemicals tends to inhibit adhesion between the lid and the container and accordingly it has been found that although a dwell time during the sealing operation where no fluoro-chemical is present in the paperboard is about 2 to 4 seconds, this dwell time should advantageously be increased to about 4 to 6 seconds when fluoro-chemicals are present with the paperboard.

Paperboard with or without fluoro-chemical treatment having a total thickness of up to and even in excess of 24 mils can be effectively treated by following the above method.

In the heat-sealable, ovenable board containers of the present invention it should be understood that the thermoplastic and thermosetting coatings are applied only to the inside of the lids and the trays. Additionally, the modified polyester coated lids can be further coated on the outer surface with a suitable lacquer to improve lid stability as well as appearance.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for heat-sealing an ovenable board container containing a tray portion and a closure portion, one of said tray portion or said closure portion being provided with a thermoplastic polyester coating and the other of said tray portion or said closure portion being provided with a cross-linked, thermosetting polyester-containing coating, which comprises placing said tray portion and said closure portion into mutual contact to form an assembled container, and heat-sealing said assembled container at a temperature of about 496° to 650° F. and at a contact pressure of about 108 to 200 psi to form a self-venting, easy-tear seal.

2. The method according to claim 1, wherein the tray portion and the closure portion form a contacting rim portion and said pressure is applied to said contacting rim portion.

3. The method according to claim 1, wherein said coatings are provided on the inside surface of the assembled container.

4. The method according to claim 1 or 3, wherein the thermoplastic polyester coating is polyethylene terephthalate.

5. The method according to claims 1 or 3, wherein the cross-linked, thermosetting polyester coating is a water-reducible, melamine modified, polyester copolymer.

6. The method according to claim 1, wherein the polyester coatings have a thickness of up to about 2 mils.

7. The method according to claim 1, wherein the thermoplastic polyester coating is disposed on the closure portion and the cross-linked, thermosetting polyester-containing coating is disposed on the tray portion.

8. The method according to claim 1, wherein the thermoplastic polyester coating is disposed on the tray portion and the cross-linked thermosetting, polyester-containing coating is disposed on the closure portion.

9. The method according to claim 1, wherein the tray portion and the closure portion are ovenable paperboard.

10. The method according to claim 9, wherein the paperboard contains a fluoro-chemical.

11. The method according to claim 9, wherein the paperboard is provided with a fluoro-chemical coating.

12. The method according to claims 10 or 11, wherein the heat-sealing treatment has a dwell time of about 4 to 6 seconds.

13. The method according to claim 1, wherein the heat-sealing treatment has a dwell time of about 2 to 4 seconds.

* * * * *